Nov. 26, 1940.  J. C. MARIS  2,223,290
SPRING RIGGING FOR LOCOMOTIVE TRAILER TRUCKS
Filed July 7, 1938  2 Sheets—Sheet 2
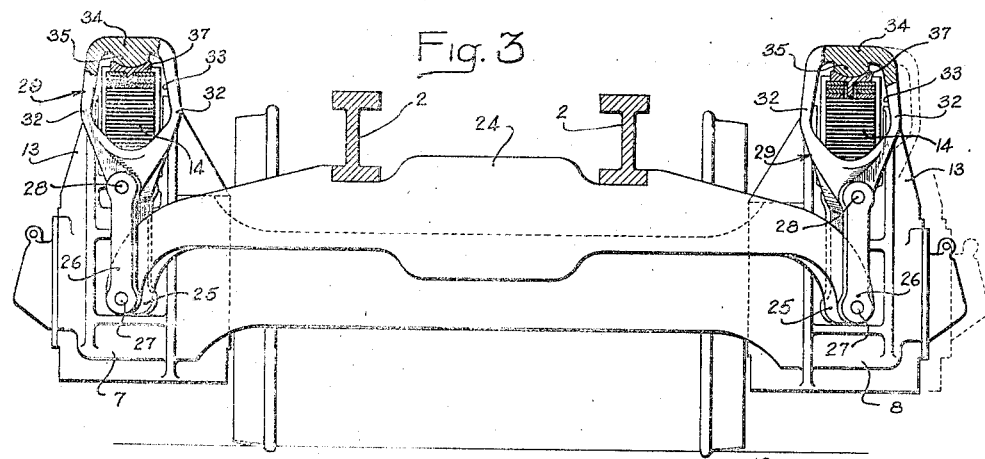
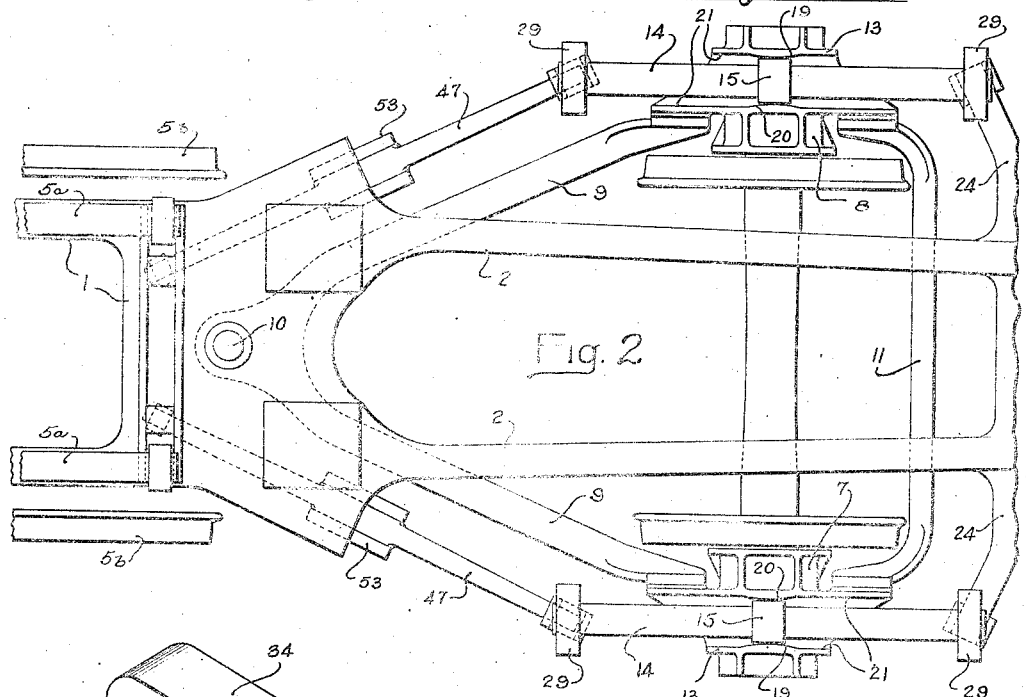
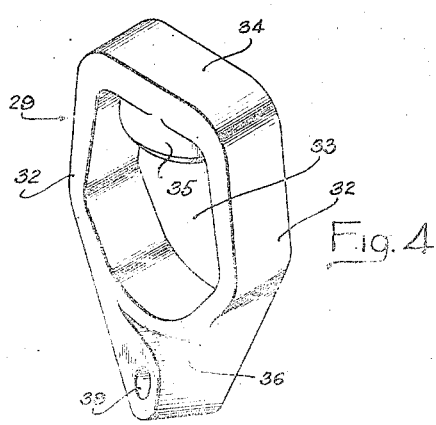
INVENTOR
JAMES C. MARIS
BY
ATTORNEY Patented Nov. 26, 1940

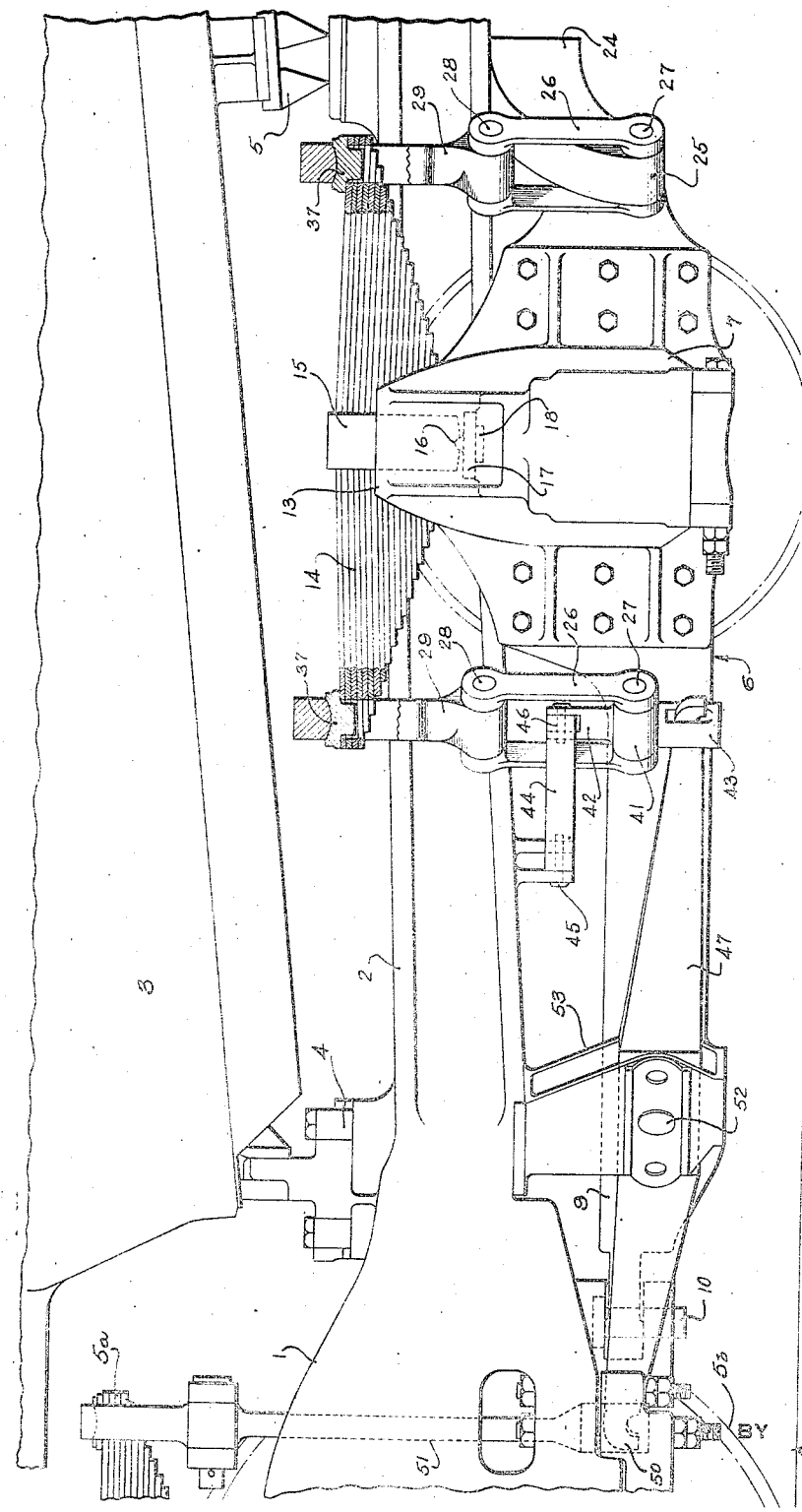

2,223,290

UNITED STATES PATENT OFFICE 2,223,290

SPRING RIGGING FOR LOCOMOTIVE TRAILER TRUCKS

James C. Maris, Glenolden, Pa.

Application July 7, 1938, Serial No. 217,978

1 Claim. (Cl. 105—82)

This invention relates generally to locomotive trailer trucks and more particularly to an improved spring hanger arrangement therefor.

It is an object of my invention to provide an improved trailer truck that will allow a truck spring of the longitudinal leaf type to remain substantially parallel to the main frame of the locomotive while at the same time allowing the truck to swing a very substantial distance laterally when traveling around sharp curves such as are encountered particularly in switching service.

Another object is to provide an improved trailer truck spring hanger arrangement that is relatively simple and economical in construction and maintenance and is sturdy as well as having a high degree of flexibility without imposing undue stresses upon hanger links.

Other objects and advantages will be more apparent to those skilled in the art from the following description of the accompanying drawings in which:

Fig. 1 is a fragmentary elevation of the rear portion of a locomotive employing a trailer truck in which my invention is embodied;

Fig. 2 is a plan view of Fig. 1 but with the fire box removed;

Fig. 3 is an end elevation of Fig. 2 viewed from the right end thereof, certain parts being shown in section;

Fig. 4 is a perspective of one of the spring hanger links.

In the particular embodiment of the invention, such as is disclosed herein merely for the purpose of illustrating one specific form among possible others that the invention might take in practice, I have shown a conventional type of main locomotive frame 1 having a rear extension or cradle 2 upon which the fire box 3 is supported in any usual manner as at 4 and 5. A usual main driving spring rigging system 5a and driving wheels 5b are employed as well as a usual Hodges type trailer truck generally indicated at 6.

The trailer truck comprises two journal box housing castings 7 and 8 bolted or otherwise suitably secured to a V-shaped frame 9 (Fig. 2) which is pivoted at 10 to the main locomotive frame 1. A cross member 11 is also bolted or otherwise suitably secured to the journal box housings 7 and 8. Each of the journal box housings have usual spring saddles 13 projecting upwardly on each side of the longitudinal truck springs 14. Inasmuch as the entire trailer truck and spring rigging therefor are symmetrical about its longitudinal centerline, it will suffice to describe the remaining structure for only one side thereof. The main spring 14 is provided with a spring band 15 which is rockably supported on a transverse ridge 16, Fig. 1, this ridge being formed on a plate 17 having an integrally formed centering pin or projection 18 seated in a suitable recess in the journal box housing. As shown in Fig. 2 the opposing walls of the spring saddle 13 have arcuate portions 19 and 20 engaging the side surfaces of spring band 15. The construction so far described will allow usual relative movement between the spring and truck frame about both the vertical axis of centering device 18 and about the transverse axis of ridge 16, the arcuate surface 19 and 20, Fig. 2, maintaining the spring in its operative relation to the centering pin 18. It will be understood that the major portion 21 of the side walls of the spring saddle 13 are sufficiently spaced apart, Fig. 2, to permit ample relative lateral movement between the main spring and truck frame.

To connect truck springs 14 to the cradle 2 of the main locomotive frame, the cradle is provided as shown in Figs. 1 and 3 with a rearwardly located transverse member 24 whose ends turn downwardly and forwardly as at 25. A lower set of swing links 26 are pivoted as at 27 to the end 25 and are pivoted as at 28 to an upper swing link 29. The upper link as shown in Figs. 3 and 4 is of a peculiar and improved loop form in that it has bulged out sides 32 with a similarly shaped opening 33, the opening being closed at its top by a cross connection 34 from which a vertical boss 35 depends. In addition the lower end of the link 29 simultaneously converges and twists as clearly shown at 36, Fig. 4. The boss 35 has a spherical surface seated in a spherical seat member 37 which rests upon the upper side of the main spring and has a tongue extending downwardly within a usual opening in the spring leaves. The pivot pin 28 of the lower links 26 is supported in an opening 39 in the twisted lower portion 36 so that the pin axis lies in a plane angularly disposed both to the plane of the loop and to the longitudinal axis of the truck springs 14 and locomotive cradle 2.

The forward end of the truck spring is also operatively connected to the main frame by the provision of forwardly located upper and lower spring hanger links identical to the rearwardly located links and which are therefore given the same reference numbers and hence need not be described further. The lower pin 27 is however connected to a suitable hub 41 which has upwardly and downwardly extending ears 42 and 43, the upper ear 42 is held in fixed lateral relation to the locomotive frame cradle 2 by the provision of a suitable and usual type of brace 44 pivotally connected to cradle 2 as generally indicated at 45 and pivotally connected to ear 42 as at 46. While the ear 42 is held in fixed lateral relation to the cradle 2, yet relative vertical movement therebetween is possible as generally shown in this type of mounting in the patent to Rushton et al. 1,060,499. A longitudinal equalizing beam 47 is supported at one end in a suitable opening in ear 43 and is supported at its other end 50 in a spring hanger link 51 of the main spring rigging. The equalizing beam 47 is pivotally connected at 52 to a suitable bracket 53 upon which cradle 2 is supported. The equalizing beams 47 are of the type which converge inwardly toward the main spring rigging system as shown in Fig. 2 and further detailed description is not necessary as this is a usual and well-known arrangement.

Furthermore, the vertical distance between pin 27 and seat 37 is identical for both the forward and rear sets of links 26, 29. Hence the links, by virtue of these equal distances and because both sets of links are connected to the main locomotive frame or its cradle, will allow truck springs 14 to be maintained in substantial parallelism with the locomotive frame during relative swinging movement between the truck and locomotive frames. However, heretofore the foregoing arrangement has not been sufficient to allow sharp turning of the locomotive without imposing extraordinary stresses in the linkage with consequent undue breakage of the swing links. The breakage of links has heretofore imposed a decided limitation in the usefulness of the general type of truck herein disclosed. Notwithstanding these long known limitations, no adequate solution to the problem has been offered, at least insofar as maintaining all of the desirable general characteristics of this type of truck. In some instances it has been heretofore suggested to connect one set of links to the cradle of the main locomotive frame and to connect the other set of links to the truck frame. While this tends to provide an averaging action between the forward and rear sets of links and the stresses set up therein, yet such an arrangement defeats certain desirable characteristics of this general type of truck.

In my improved arrangement I maintain the connection between all sets of the spring hanger links and the locomotive frame and yet overcome the limitations in this type of arrangement by including link 29 in my improved spring rigging combination. The link 29 by virtue of being seated on top of seat 37 is adapted to insure maximum swinging length for the combined links 29 and 26, and also the possibility of undue stresses being set up is minimized by the ability of the spherical connection between 35 and 37 to allow universal movement of link 29 regardless of the sharpness of the curve around which the locomotive may travel. The laterally bulged opening formed within link 29 is such as to permit link 29 to have maximum rotation about its vertical axis relative to the truck springs 14, while the twisted lower end of link 29 insures a normal natural alignment between the links 29 and lower links 26 with minimum possibility of undue stresses being created therebetween. Inasmuch as the forward and rearward sets of truck spring hanger links are identical in construction, relation and operation, it is seen that a very effective and simple arrangement is provided for overcoming the difficulties incident to the prior art arrangements.

It will of course be understood that various changes in details of construction and arrangement of parts may be made by those skilled in the art without departing from the spirit of the invention as set forth in the appended claim.

I claim:

A spring hanger link for a spring rigging equalizing system of a trailer truck comprising a loop having bulged out sides with a similarly shaped bulged opening and having an upper cross member with a spherical supporting surface, said loop having a lower portion which simultaneously converges and twists with a bolt opening therein disposed so that its axis lies in a plane extending angularly both to the plane of the loop sides and to the longitudinal axis of the loop opening.

JAMES C. MARIS.